UNITED STATES PATENT OFFICE.

JULIUS ALTSCHUL, OF BERLIN, AND WILHELM URBAN, OF BERLIN-WILMERSDORF, GERMANY, ASSIGNORS TO ACTIEN GESELLSCHAFT FÜR ANILIN FABRIKATION, OF BERLIN, GERMANY.

COMPOUNDS OF THE SAFRANIN DYES ESPECIALLY ADAPTED FOR INTERNAL USE.

1,183,711. Specification of Letters Patent. Patented May 16, 1916.

No Drawing. Application filed March 13, 1914. Serial No. 824,480.

*To all whom it may concern:*

Be it known that we, JULIUS ALTSCHUL and WILHELM URBAN, the former a citizen of the United States of North America, the latter a citizen of Germany, residing, respectively, at Berlin, Germany, and Berlin-Wilmersdorf, Germany, (our post-office addresses being 10 Hafenplatz, Berlin, Germany, and 17 Augustastrasse, Berlin-Wilmersdorf, Germany,) have invented certain new and useful Improvements in Compounds of the Safranin Dyes Especially Adapted for Internal Use, of which the following is a specification.

The present invention relates to new compounds of the safranin dyes which contain the residue of a tanning body or compound and which may be obtained for instance by causing an organic acid salt of a safranin, such as for instance tolusafranin or dimethylphenosafranin, to react with tannin (tannic acid); or the free base of the safranins in question may be caused to react with a tannin. On the other hand a suitable salt of a tannin can be acted upon with a salt of a safranin. Thus for instance the acetate or hydrochlorid of tolusafranin may be brought into reaction with the sodium salt of tannic acid.

Our new compounds are especially adapted for the internal use of safranin dyes some of which have proved to be of a specific healing influence upon human and animal diseases based upon the action of trypanosoma and similar protozoa or bacteria and which are also especially active against foot- and mouth-disease, catarrhal affection of dogs (convulsive fit) and pyroplasmose of cattle.

In comparison with the parent safranins our new compounds possess the great advantage that they have no purgative effect and thus they may be employed even in cases where it is impossible to use the safranin itself. Notwithstanding their very sparing solubility the new compounds act as well as the parent safranins.

The following examples may serve to illustrate our invention, the parts being by weight:

1. 91 parts of tolusafranin hydrochlorid

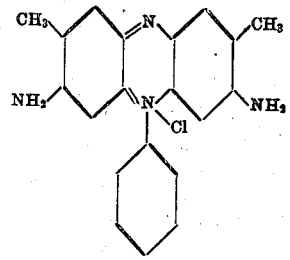

are dissolved in 1000 parts of water and this solution is precipitated by adding a solution of tannin which has been prepared from 180 parts of this body, 2000 parts of water and 138 parts of soda-lye of 8 per cent. strength. The precipitation thus obtained is drained, well washed and dried.

2. 91 parts of tolusafranin hydrochlorid are dissolved at the boil in 1200 parts of alcohol with the addition of 138 parts of soda-lye of 8 per cent. strength; the solution is filtered and the alcoholic solution of the safranin base thus obtained is precipitated by the addition of an aqueous solution of 180 parts of tannin in 2000 parts of water. In order to complete the separation of the tannin compound a saturated aqueous solution of common salt is added in proportion of about ⅕ of the volume of the alcoholic solution. The precipitate is drained, washed and dried.

3. 175 parts of dimethylphenosafranin hydrochlorid are dissolved in 2000 parts of water, the solution added with 330 parts of soda-lye 8 per cent. strength and the safranin base separated by adding common salt. The precipitate is drained, washed with an aqueous solution of common salt and then dissolved in 2000 parts of alcohol; the solution after having been filtered from a small quantity of common salt is added with a solution of 350 parts of tannin in 3500 parts of water. In order to separate the new tannin compound an aqueous solution of common salt is added and the precipitate thus obtained is drained, washed and dried.

4. 1000 parts of tolusafranin (hydrochlorid) are dissolved in hot water; after cooling 500 parts of crystallized sodium acetate are added and to the tolusafranin acetate thus formed then an aqueous solution of 2000 parts of tannin is gradually introduced while stirring. The new tannin compound separates and is isolated by filtering, well washing and drying. It is a red powder, nearly insoluble in water and alcohol, dissolving in concentrated sulfuric acid to a green solution which on the addition of ice turns to blue, then to red and becomes troubled which new compound when shaken with ten parts of water while adding soda-lye and filtered yields a solution which, after acidulating with acetic acid, assumes a violet coloration upon the addition of ferric chlorid.

It is obvious that our present invention is not limited to the foregoing examples or to the details given therein. Thus for instance instead of the safranin dyes used in the foregoing examples other safranins may be employed such as for instance phenotolusafranin. Furthermore instead of tannin itself any other suitable "tanning" body or compound either natural or artificial containing carboxylic groups may be used without departing from the scope of our invention and we regard as a "tanning" substance in the sense of our invention and therefore as an equivalent of tannin itself every substance which is capable of precipitating gelatin and of more or less completely tanning hide into leather.

Having now described our invention and the manner in which it may be carried out we declare that what we claim is,—

1. New compounds of the safranin dyes especially adapted for internal use containing the base of a safranin dye in combination with a tanning compound, containing carboxylic groups, these compounds being red powders, sparingly soluble in water and having no purgative effect.

2. New compounds of the safranin dyes especially adapted for internal use containing the base of a safranin dye in combination with the residue of a tannin, these compounds being sparingly soluble in water, dissolving in concentrated sulfuric acid to a green solution and having no purgative effect.

3. New compounds of the safranin dyes especially adapted for internal use containing the base of a methylated safranin in combination with a tannin, these compounds being red powders, sparingly soluble in water, having no purgative effect and dissolving in concentrated sulfuric acid to a green solution, which on the addition of ice turns to blue and then to red.

4. New compounds of the safranin dyes especially adapted for internal use containing the base of tolusafranin in combination with a tannin, these compounds being red powders, sparingly soluble in water, having no purgative effect and dissolving in concentrated sulfuric acid to a green solution, which on the addition of ice turns to blue and then to red.

5. New compounds of the safranin dyes especially adapted for internal use containing the base of tolusafranin in combination with tannic acid (tannin), these compounds being red powders, sparingly soluble in water, having no purgative effect and dissolving in concentrated sulfuric acid to a green solution, which on the addition of ice turns to blue and then to red.

6. New compounds of tolusafranin especially adapted for internal use containing upon one molecule of tolusafranin several molecules of tannic acid (tannin), these compounds being red powders, sparingly soluble in water, having no purgative effect and dissolving in concentrated sulfuric acid to a green solution, which on the addition of ice turns to blue and then to red.

7. A new compound of tolusafranin especially adapted for internal use containing in combination with one molecule of tolusafranin two molecules of tannic acid (tannin), which new compound in the dry state when powdered forms a dark red powder, nearly insoluble in water and alcohol, dissolving in concentrated hydrochloric acid to a troubled solution of a blue-green coloration, which on diluting with water turns to blue and then to violet, and dissolving in concentrated sulfuric acid to a green solution which on the addition of ice turns to blue, then to red and becomes troubled, which new compound when shaken with ten parts of water while adding soda-lye and filtered yields a solution which after acidulating with acetic acid assumes a violet coloration on the addition of ferric chlorid.

8. The hereinbefore-described process for producing new compounds of the safranin dyes especially adapted for internal use by acting with an organic acid salt of a safranin base upon a tanning compound containing carboxylic groups.

9. The hereinbefore-described process for producing new compounds of the safranin dyes especially adapted for internal use by acting upon one molecule of an acetate of tolusafranin with several molecules of tannin.

10. The hereinbefore-described process for producing a new compound of tolusafranin by acting upon one molecule of tolusafranin acetate with more than 2 molecules of tannin.

In testimony whereof we have hereunto set our hands in presence of two subscribing witnesses.

JULIUS ALTSCHUL.
WILHELM URBAN.

Witnesses:
 WOLDEMAR HAUPT,
 HENRY HASPER.